(No Model.)
L. C. HILL.
HAND WEEDER.
No. 311,428.  Patented Jan. 27, 1885.
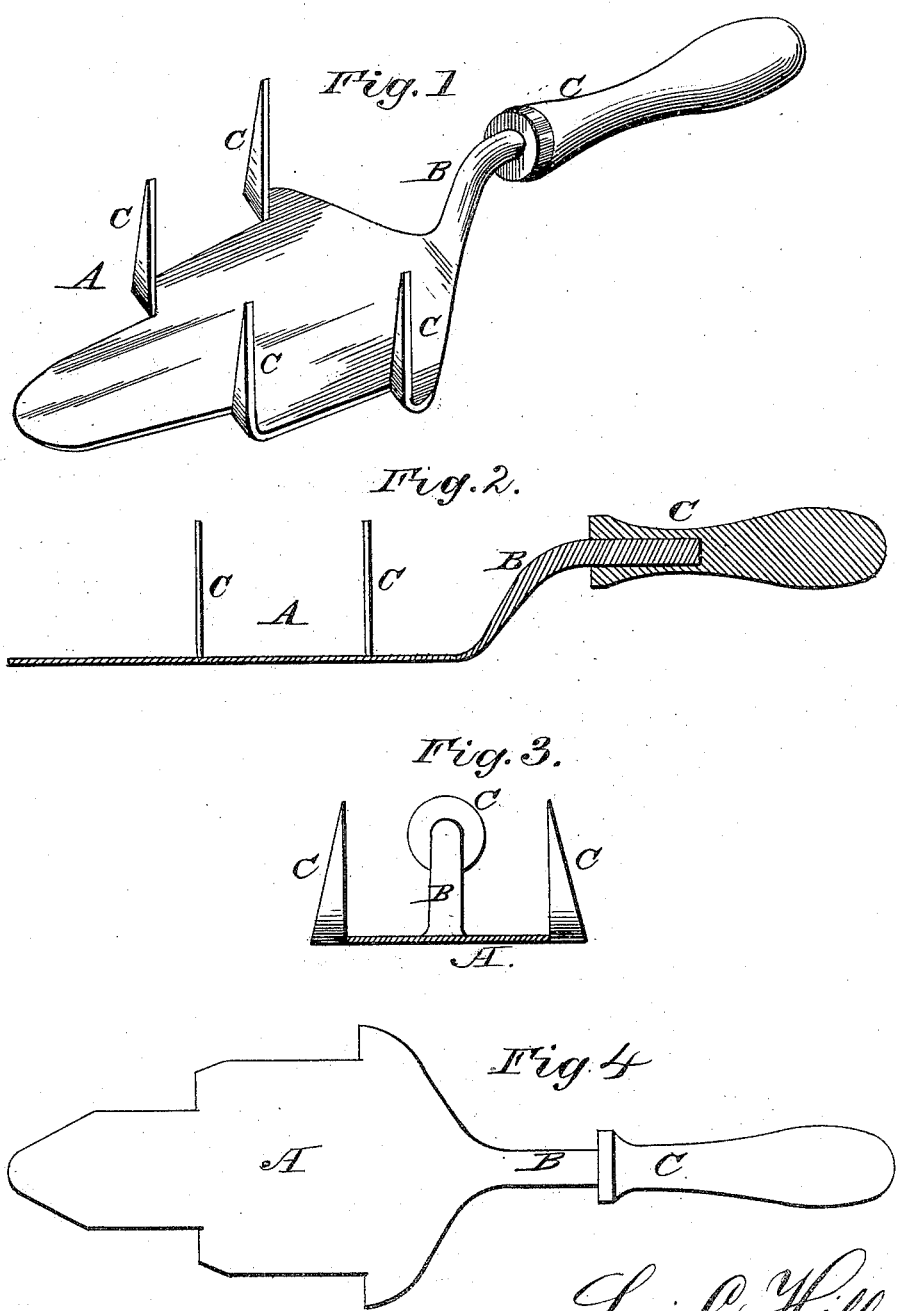
WITNESSES:
Louis C Hill
INVENTOR.
By Louis Bagger & Co.
ATTORNEYS.

UNITED STATES PATENT OFFICE.

LOUIS C. HILL, OF MYRTLE CREEK, OREGON, ASSIGNOR OF ONE-HALF TO JOHN W. WEAVER, OF SAME PLACE.

HAND-WEEDER.

SPECIFICATION forming part of Letters Patent No. 311,428, dated January 27, 1885.

Application filed July 5, 1884. (No model.)

*To all whom it may concern:*

Be it known that I, LOUIS C. HILL, a citizen of the United States, and a resident of Myrtle Creek, in the county of Douglas and State of Oregon, have invented certain new and useful Improvements in Hand-Weeders; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved hand-weeder. Fig. 2 is a longitudinal vertical sectional view of the same. Fig. 3 is a transverse sectional view, and Fig. 4 is a bottom view.

The same letters refer to the same parts in all the figures.

This invention relates to devices for cultivating the soil by hand; and it consists in the improved construction of a hand-weeder, which will be hereinafter fully described, and particularly pointed out in the claims.

In the drawings, A designates the blade of my improved hand-weeder, which is preferably of an approximately rhomboidal shape, and provided with a shank, B, upon which a handle, C, is suitably secured. The blade may be made of wrought-steel or other suitable material, and it is provided at its front edges with struck-up teeth or fingers C C, which are set at about right angles to the blade, and which may be of any suitable width.

The operation of this invention will be readily understood from the foregoing description, taken in connection with the drawings. The device may be used as a trowel, or by reversing it the teeth may be used for stirring and agitating the soil around the roots of growing plants. The device is simple and inexpensive, and it forms a convenient combination-tool, comprising in a single device a combined trowel, hoe, and rake.

My improved hand-weeder may be constructed in a different manner from that herein described without departing from the spirit of my invention. Thus, for instance, the teeth may be constructed separately, and attached to the blade of the trowel by welding, riveting, or otherwise, and other changes may be made in the construction of the device, which may be made so far as they do not change the principal features of the same.

Having thus described my invention, I claim and desire to secure by Letters Patent of the United States—

1. As an improvement in hand-weeders, a trowel-shaped blade provided with a suitable shank and handle, and having downwardly-extending teeth, substantially as herein described, for the purpose set forth.

2. The herein-described improved garden-tool or weeder, consisting of a trowel-shaped blade having a suitable shank and handle, and provided with teeth struck up from its front edges and extending downwardly nearly at right angles to the blade, substantially as and for the purpose set forth.

In testimony that I claim the foregoing as my own I have hereunto affixed my signature in presence of two witnesses.

LOUIS C. HILL.

Witnesses:
JENNIE BUICK,
D. S. K. BUICK.